US007384497B2

(12) United States Patent
Christensen et al.

(10) Patent No.: US 7,384,497 B2
(45) Date of Patent: Jun. 10, 2008

(54) PROCESS FOR ENCAPSULATION OF CELLULOSE BASED SUBSTRATES USING ELECTROMAGNETIC RADIATION HEATING

(75) Inventors: Elmer Christensen, Kent, WA (US); Brian C. Horsfield, Federal Way, WA (US); Gerald Wilhite, Bowling Green, KY (US); Herbert D. Muise, deceased, late of Tumwater WA (US); H. Donald Muise, Jr., legal representative, Tumwater, WA (US)

(73) Assignee: Weyerhaeuser Company, Federal Way, WA (US)

( * ) Notice: Subject to any disclaimer, the term of this patent is extended or adjusted under 35 U.S.C. 154(b) by 393 days.

(21) Appl. No.: 10/879,268

(22) Filed: Jun. 29, 2004

(65) Prior Publication Data

US 2005/0284563 A1   Dec. 29, 2005

(51) Int. Cl.
B29C 65/00 (2006.01)
(52) U.S. Cl. .............. 156/285; 156/272.2; 428/144
(58) Field of Classification Search ............. 156/286, 156/250, 267, 272.2, 285
See application file for complete search history.

(56) References Cited

U.S. PATENT DOCUMENTS

| 3,790,399 A * | 2/1974 | Frappier et al. ........... 427/285 |
| 3,929,536 A | 12/1975 | Maughaun et al. |
| 4,087,300 A | 5/1978 | Adler |
| 4,540,392 A | 9/1985 | Junod et al. |
| 4,722,474 A | 2/1988 | Dropsy |
| 4,749,430 A | 6/1988 | Samuelson et al. |
| 4,806,398 A | 2/1989 | Martin, Jr. |
| 4,871,406 A | 10/1989 | Griffith |
| 5,009,308 A | 4/1991 | Cullen et al. |
| 5,108,355 A | 4/1992 | Walsh |
| 5,133,999 A | 7/1992 | Löfgren et al. |
| 5,143,660 A * | 9/1992 | Hamilton et al. .......... 264/1.37 |
| 5,145,549 A | 9/1992 | Mosburger |
| 5,176,251 A | 1/1993 | Davis et al. |
| 5,240,111 A | 8/1993 | Yamashita et al. |
| 5,316,609 A | 5/1994 | Guither et al. |
| 5,575,418 A | 11/1996 | Wu et al. |
| 5,609,293 A | 3/1997 | Wu et al. |
| 5,632,404 A | 5/1997 | Walsh |

(Continued)

FOREIGN PATENT DOCUMENTS

WO   WO 90/09927 A1   9/1990

(Continued)

OTHER PUBLICATIONS

Coles, Richard et al., Food Packaging Technology, 2003, Blackwell Publishing Ltd., pp. 193 and 256.*

Primary Examiner—Richard Crispino
Assistant Examiner—Emily Chimiak

(57) ABSTRACT

A method for encapsulating a cellulose based substrate with polymeric film involves raising the temperature of the respective films using an electromagnetic radiation source and providing a pressure differential between an environment defined between the films and an environment external to the films so that conformance of the films to the cellulose based substrates is promoted. The cellulose based substrate is entirely encapsulated by the plastic films and the films are sealed around the peripheral edges of the cellulose based substrate as well as edges that are defined by slots and cutouts.

16 Claims, 9 Drawing Sheets

U.S. PATENT DOCUMENTS

| | | |
|---|---|---|
| 5,651,851 A | 7/1997 | Gatcomb |
| 5,665,408 A * | 9/1997 | Coupe et al. ............... 426/113 |
| 5,690,775 A | 11/1997 | Calvert et al. |
| 5,725,917 A | 3/1998 | Parks |
| 5,746,871 A | 5/1998 | Walsh |
| 5,783,030 A | 7/1998 | Walsh |
| 5,792,301 A | 8/1998 | Calvert et al. |
| 5,794,812 A | 8/1998 | Walsh |
| 5,968,636 A | 10/1999 | Sinclair et al. |
| 5,988,494 A | 11/1999 | Fontaine |
| 6,113,981 A | 9/2000 | Ogilvie, Jr. et al. |
| 6,221,192 B1 | 4/2001 | Walsh |
| 6,332,488 B1 | 12/2001 | Walsh |
| 6,338,234 B1 * | 1/2002 | Muise et al. .................. 53/411 |
| 6,352,096 B1 | 3/2002 | Walsh |
| 6,358,558 B1 | 3/2002 | Viitanen |
| 6,632,163 B2 | 10/2003 | Zumbiel |
| 2001/0022211 A1 | 9/2001 | Walsh |
| 2002/0000297 A1 | 1/2002 | Kitano et al. |
| 2002/0036229 A1 | 3/2002 | Muise et al. |

FOREIGN PATENT DOCUMENTS

| | | |
|---|---|---|
| WO | WO 94/02364 A1 | 2/1994 |
| WO | WO 99/20977 A1 | 4/1999 |

* cited by examiner

PROCESS FOR ENCAPSULATION OF CELLULOSE BASED SUBSTRATES USING ELECTROMAGNETIC RADIATION HEATING

FIELD OF THE INVENTION

The present invention relates to methods employing electromagnetic radiation for encapsulating a cellulose based substrate in a polymeric film and product formed thereby.

BACKGROUND OF THE INVENTION

Containers made from fibreboard are used widely in many industries. For example, fibreboard containers are used to ship products that are moist or packed in ice such as fresh produce or fresh seafood. It is known that when such containers take up moisture, they lose strength. To minimize or avoid this loss of strength, moisture-resistant shipping containers are required.

Moisture-resistant containers used to date have commonly been prepared by saturating cellulose based substrates with melted wax after folding and assembly. Wax-saturated containers cannot be effectively recycled and must generally be disposed of in a landfill. In addition, wax adds a significant amount of weight to the cellulose based substrate, e.g., the wax can add up to 40% by weight to the cellulose based substrate.

Other methods for imparting moisture resistance to cellulose based substrates have included impregnation with a water-resistant synthetic resin or coating the blank with a thermoplastic material. In the latter case, forming water-resistant seals around cellulose based substrate peripheral edges and edges associated with slots or cutouts in the cellulose based substrate has been an issue. When seals along these edges are not moisture resistant or fail, moisture can be absorbed by the cellulose based substrate with an attendant loss of strength. In addition, obtaining consistent and reproducible bonding of the thermoplastic material to the cellulose based substrate and around edges has been a challenge.

Faced with the foregoing, the present inventors have worked to develop a method for producing a cellulose based substrate encapsulated with a moisture-resistant film that is recyclable and lighter in weight than previous wax-saturated containers and does not suffer from inconsistent bonding, sealing and conformance of a film to the substrate.

SUMMARY OF THE INVENTION

Fresh produce growers, distributors of fresh produce and fresh produce retailers will find the encapsulated cellulose based substrates, in the form of container blanks of the present invention desirable for a number of reasons, including their recyclable nature and their lighter weight compared to conventional wax-saturated blanks. The lighter weight will translate into reduced shipping costs. Manufacturers of container blanks will find the methods of the present invention desirable because the methods provide an effective way to reproducibly manufacture container blanks encapsulated with a polymeric film without the need to use wax which inhibits recycling of the container. Furthermore, the clarity of graphics associated with container blanks formed in accordance with the methods of the present invention can be superior to the clarity of graphics associated with wax-saturated container blanks.

In one aspect, the present invention is directed to a method for encapsulating a cellulose based substrate, one example of which is a container blank, with a polymeric film. In accordance with this aspect of the present invention, a cellulose based substrate having a first surface, a second surface opposite the first surface, and a cellulose based substrate periphery is provided. A first polymeric film is provided adjacent the first surface. This first polymeric film extends beyond the cellulose based substrate periphery. Adjacent the second surface of the cellulose based substrate is provided a second polymeric film which also extends beyond the cellulose based substrate periphery. The temperature of the first polymeric film adjacent the first surface and the second polymeric film adjacent the second surface is increased using electromagnetic radiation. The heated first polymeric film and the heated second polymeric film cooperate to define an envelope that substantially encapsulates the cellulose based substrate. To promote the conformance and adhesion of the polymeric films to the cellulose based substrate, a pressure differential is provided between an environment within the envelope defined by the first and second films and an environment outside such envelope. This pressure differential promotes the conformance of the first polymeric film and second polymeric film to the cellulose based substrate, particularly its peripheral edges, and any cutouts or slots provided therein. The first and second polymeric film adjacent the cellulose based substrate periphery and any edges defining slots and cutouts are bonded to each other in order to provide a moisture-resistant seal around the exposed edges.

In accordance with the present invention, the pressure differential can be provided a number of different ways, including use of vacuum and/or pressure chambers, vacuum nozzles or generating steam within the envelope and then allowing the steam to condense. In accordance with the present invention, excess polymeric film can be trimmed from around the peripheral edges of the cellulose based substrate as well as within any slots or cutouts that are provided in the cellulose based substrate.

Polymeric film encapsulated cellulose based substrates formed in accordance with the present invention can be folded and secured to form containers suitable for containing moist materials such as fresh produce or seafood. After use, the containers can be recycled and the polymeric film separated from the cellulose based materials forming the container blank.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As used herein, the following terms have the following meanings.

Fibreboard refers to fabricated paperboard used in container manufacture, including corrugated fibreboard.

Container refers to a box, receptacle, or carton that is used in packing, storing, and shipping goods.

Moisture-resistant film refers to polymeric films that are substantially impervious to moisture. Such films are not necessarily totally impervious to moisture, although this is preferred, but the amount of moisture capable of passing through a moisture-resistant film should not be so great that such moisture reduces the strength or other properties of the cellulose based substrate to below acceptable levels.

Thermobondable refers to a property of a material that allows the material to be bonded to a surface by heating the material.

Thermoplastic refers to a material, usually polymeric in nature, that softens when heated and returns to its original condition when cooled.

Panel refers to a face or side of a container.

Score refers to an impression or crease in a cellulose based substrate to locate and facilitate folding.

Flaps refer to closing members of a container.

The present invention provides for the encapsulation of a cellulose based substrate with polymeric films. Cellulose based substrates are formed from cellulosic materials such as wood pulp, straw, cotton, bagasse, and the like. Cellulose based substrates useful in the present invention come in many forms such as fibreboard, containerboard, corrugated containerboard, and paperboard. The cellulose based substrates can be formed into structures such as container blanks, tie sheets, slip sheets, and inner packings for containers. Examples of inner packings for containers include shells, tubes, U-boards, H-dividers, and corner boards.

The following discussion proceeds with reference to an exemplary cellulosic based substrate in the form of a containerboard blank, but it should be understood that the present invention is not limited to containerboard blanks.

Figure 1:
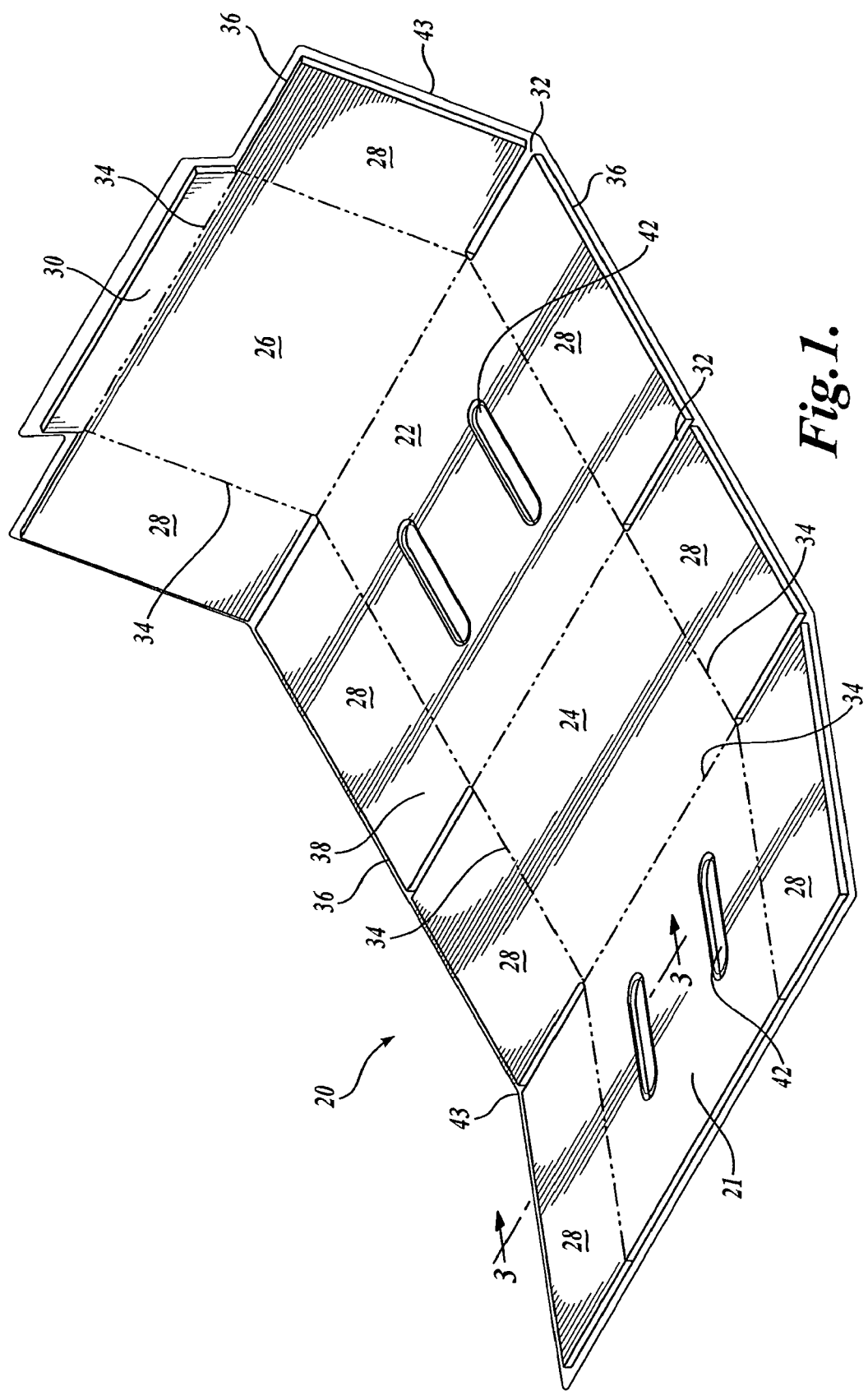
FIG. 1 is a perspective view of one surface of a container blank encapsulated with polymeric films by a method carried out in accordance with the present invention.

Referring to FIG. 1, a non-limiting example of a cellulose based substrate includes a container blank 20 having rectangular panels 21 and 22 that will form sidewalls of a container when the blank is folded and secured. Panels 21 and 22 are separated by rectangular panel 24 that will form an end wall of a container when the blank is folded. Extending from the edge of panel 22 opposite the edge connected to panel 24 is an additional rectangular panel 26 that will form a second end wall. The sequence of panels 21, 22, 24, and 26 define a lengthwise dimension for container blank 20. Each panel 21, 22, 24, and 26 includes two rectangular flaps 28 extending from the left edge and right edge thereof. Extending rearwardly from the rear edge of panel 26 is a narrow rectangular flap 30. Panels 21, 22, 24, and 26 and flaps 28 and 30 are separated from each other by either slots 32 defined as cuts formed in container blank 20 or scores 34. The external peripheral edge around container blank 20 defines a container blank periphery 36. As illustrated, container blank 20 has a first surface defined in FIG. 1 as the upper visible surface and a second opposite surface forming the underside of the container blank in FIG. 1. Panel 21 and panel 22 include cutouts 42 that serve as ventilation orifices, handles, or drainage orifices once container blank 20 is formed into a container by applying adhesive to panel 30 and positioning panel 30 adjacent to panel 21. While container blank 20 is illustrated with scores, cutouts and slots, it is understood that such features are not required and that a cellulose based substrate without such features may be encapsulated with polymeric films in accordance with the present invention. In the illustrated embodiment, the edge of the blank adjacent the container blank periphery and the blank edges that define the slots and cutouts are examples of exposed edges adjacent to which the polymeric films are sealed to each other as described below in more detail.

Overlying and underlying container blank 20 is polymeric film 43 sealed around the container blank periphery 36. Polymeric film 43 is also sealed adjacent the exposed blank edges that define slots 32 and cutouts 42. As used herein, the term "sealed" means that overlapping portions of the film adjacent the top surface and the film adjacent the bottom surface are connected to each other in a manner that substantially prevents moisture from passing through the seal.

Figure 2:
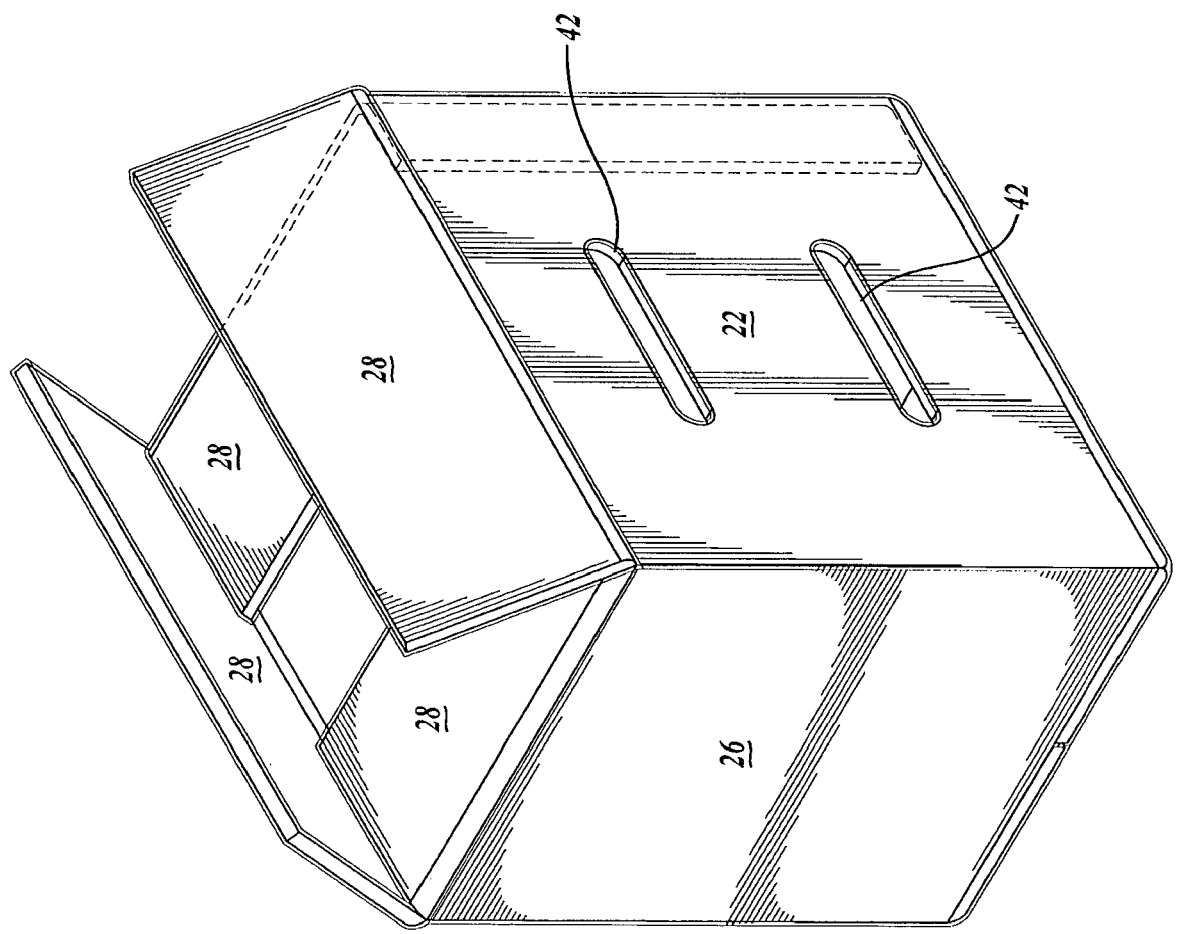
FIG. 2 is a perspective view of a container formed from the container blank of FIG. 1.

The container blank 20 can be folded and secured into a container illustrated in FIG. 2. The numbering convention of FIG. 1 is carried forward in FIG. 2. Before container blank 20 can be folded into the container of FIG. 2, the portions of films 43 within slots 32 are cut. Additionally prior to folding the container, the excess polymeric film adjacent to the periphery 36 can be trimmed. Futher more the polymeric film spanning cutouts 42 can be cut in such a manner that a passageway is made into the interior of the container while at the same time preserving the film-to-film seal.

Figure 3:
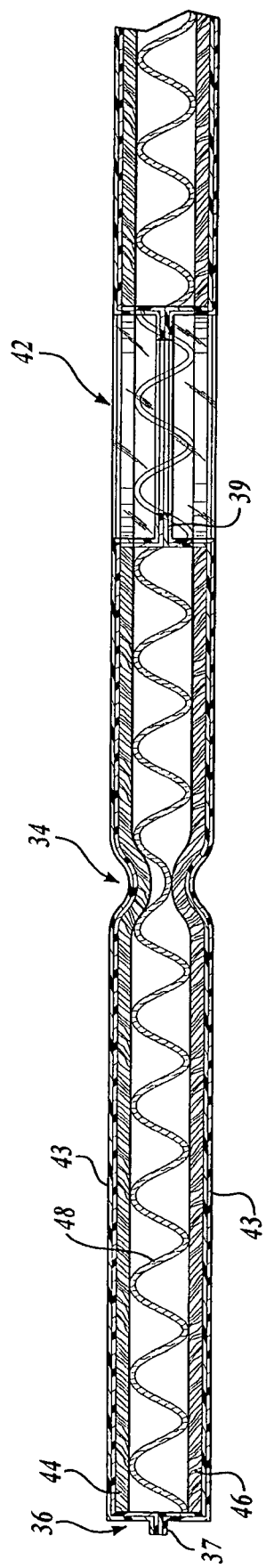
FIG. 3 is a section taken through line 3-3 of FIG. 1.

Referring to FIG. 3, container blank 20 is comprised of upper liner board 44 and lower liner board 46 spaced apart by flutes 48. An outer surface of liner board 44 is overlaid with polymeric film 43. An outer surface of lower liner board 46 is overlaid with a polymeric film 43. As illustrated in FIG. 3, polymeric films 43 may comprise two layers of material. Details regarding the films are described below in more detail. The applied polymeric films 43 conform to the topographical features defined by the peripheral edge 36, scores 34 and cutouts 42. The films conform to the topographical features by following the elevational changes in the first and second surfaces of the container blank. Preferably, films 43 conform to the shape and encapsulate the exposed edges of the container blank such as those defining slots and cutouts, and seal closely against such edges. Likewise, polymeric films 43 adjacent the container blank periphery 36 are sealed at 37 to provide a moisture-resistant bond. A similar moisture-resistant seal 39 is provided between the polymeric films 43 within cutout 42. Portions of the cellulose based substrate can be crushed before applying the polymeric films. Crushing of the cellulose based substrate adjacent the peripheral edges and the edges within cut-outs and slots has been observed to result in improved conformance of the polymeric films to the shape of the edges. Crushing of the edges can be achieved by passing the edges through a nip to temporarily reduce the caliper of the substrate and reduce its resilience to deformation. Crushing of the edges is commonly achieved by placing stiff rubber rollers adjacent to cutting knives.

Containerboards are one example of cellulose based substrates useful in the present invention. Particular examples of containerboard include single-wall corrugated fibreboard, double-wall corrugated fibreboard, triple-wall corrugated fibreboard and corrugated fibreboard with more walls. The foregoing are examples of cellulose based substrates and forms the cellulose based substrate may take that are useful in accordance with the methods of the present invention; however, the present invention is not limited to the foregoing forms.

Polymeric films useful in accordance with the present invention include thermobondable films that are moisture-resistant, preferably moisture impervious. Such films are generally multi-layer films, e.g., a two or more layer film. With multi-layer films, the layers preferably have different melting points, with the layer of film adjacent to the containerboard blank having a melting point that is lower than the melting point of the layer that is not directly adjacent to the containerboard blank. For example, a two-layer film wherein the layers have a melting point difference of at least 14° C.-17° C. (25° F.-30° F.) are useful. One useful polymeric film is a co-extruded film having an outer layer of linear low density polyethylene with a melting point of about 130° C. (266° F.) and an inner ethylene vinyl acetate bonding layer with a melting point of about 80° C. (176° F.). Other examples of suitable polymeric films include co-extruded films that include layers of linear low density polyethylene-low density polyethylene, ethylene methacrylic acid, and ethylene acrylic acid. Films that include layers of metallocene, Surlyn® thermoplastic resins from DuPont Company, polypropylene, polyvinylchloride, or polyesters or combinations thereof are other examples of useful polymeric films.

The choice of a specific film composition and structure will depend on the ultimate needs of the particular application for the cellulose based substrate. Films should be chosen so that they provide the proper balance between properties such as flexibility, moisture resistance, abrasion resistance, tear resistance, slip resistance, color, printability, and toughness.

Film thickness can vary over a wide range. The film should not be so thick that when it is applied to the container blank and heated it will not conform to the changes in topography along the surface of the container blank created by such things as the peripheral edges, edges defined by the slots, and edges defined by the cutouts. The films should be thick enough to survive normal use conditions without losing their moisture-resistance. Exemplary film thicknesses range from about 0.7 mil. (0.018 mm) to about 4.0 mil (0.10 mm).

The polymeric film applied to the inner and outer surfaces of the container blank can be the same, or different films can be applied to different surfaces. Choosing different films for the respective surfaces would be desirable when the particular properties needed for the respective surfaces of the container blank differ. Examples of film properties that might be chosen to be different on the respective surfaces of the container blank include those film properties discussed above. It is possible that graphics may be preprinted on the polymeric film. For food applications, the film is preferably approved for use by the United States Food and Drug Administration.

While the foregoing description of an encapsulated container blank has been provided in the context of an entire container blank, as noted above, it is understood that structural components, such as inner packings for a container such as shells, tubes, U-boards, H-boards, or corner boards can be encapsulated using the methods of the present invention prior to being formed into their supporting structure.

Figure 6:
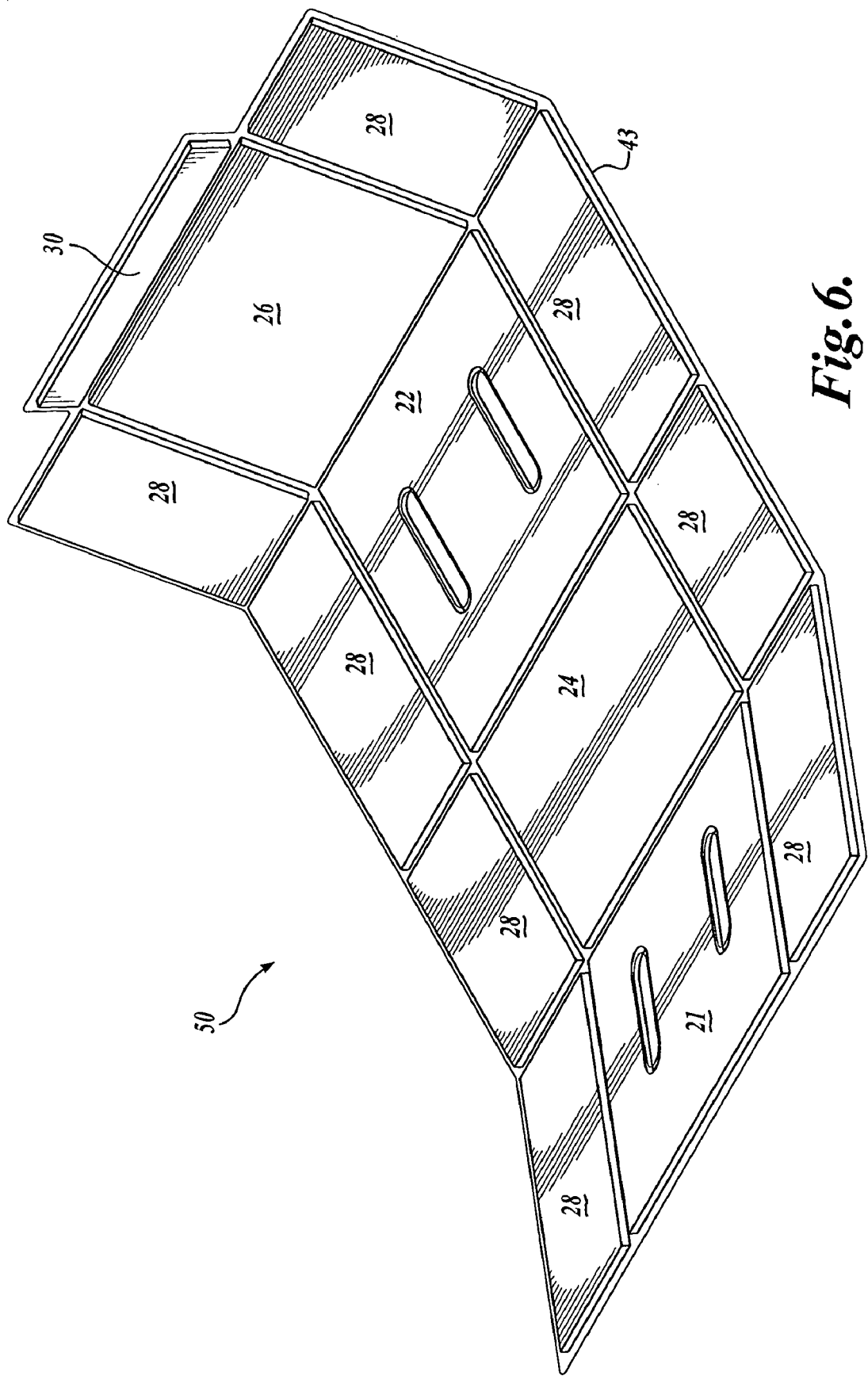
FIG. 6 is a perspective view of one surface of a second embodiment of a cellulose based substrate encapsulated with polymeric films by a method carried out in accordance with the present invention.

Referring to FIG. 6, the methods of the present invention can produce a container blank 50 wherein panels 21, 22, 24, and 26 are structurally separated from each other as well as from flaps 28 and flap 30. In this embodiment, polymeric films 43 function as a hinge between the respective panels of the container blank.

Figure 7:
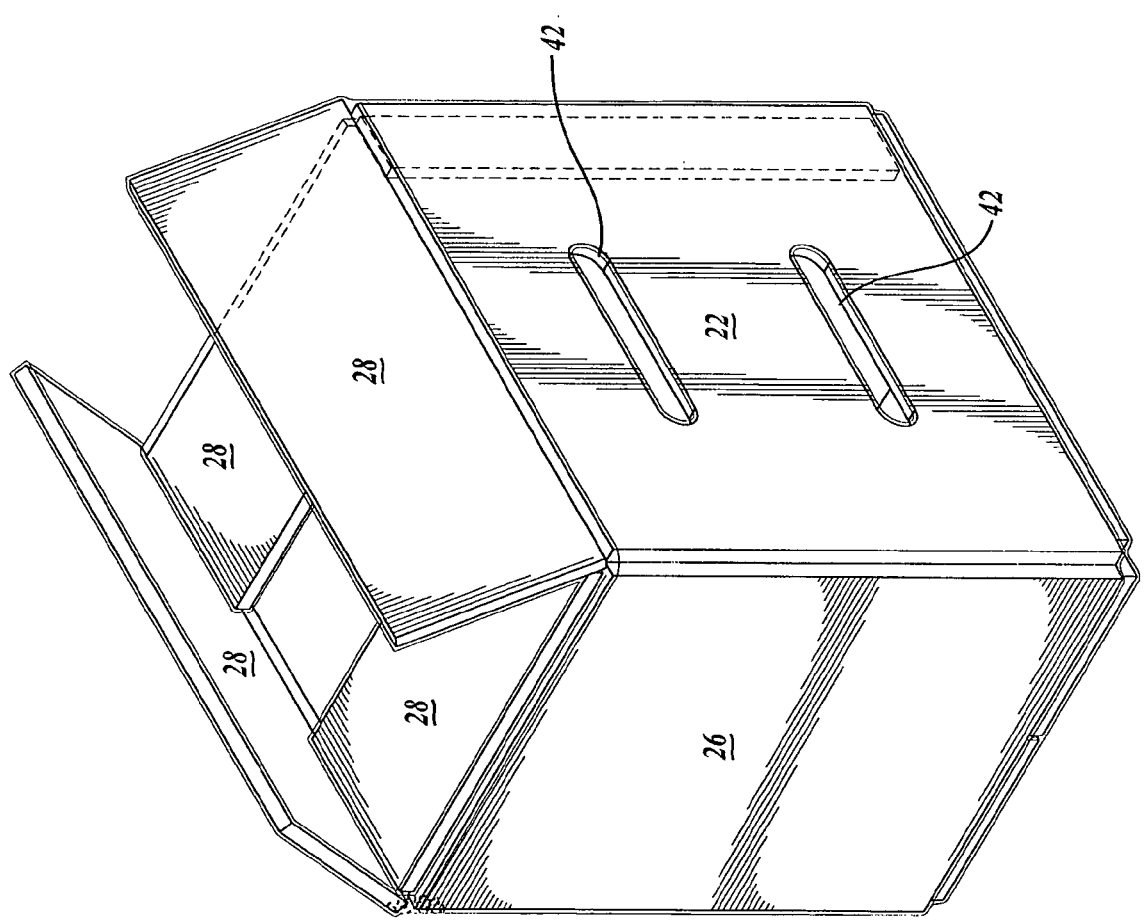
FIG. 7 is a perspective view of a container constructed from the container blank of FIG. 6.

Container blank 50 can be folded and secured into a container as shown in FIG. 7. The numbering convention of FIG. 6 is carried forward to FIG. 7.

Figure 8:
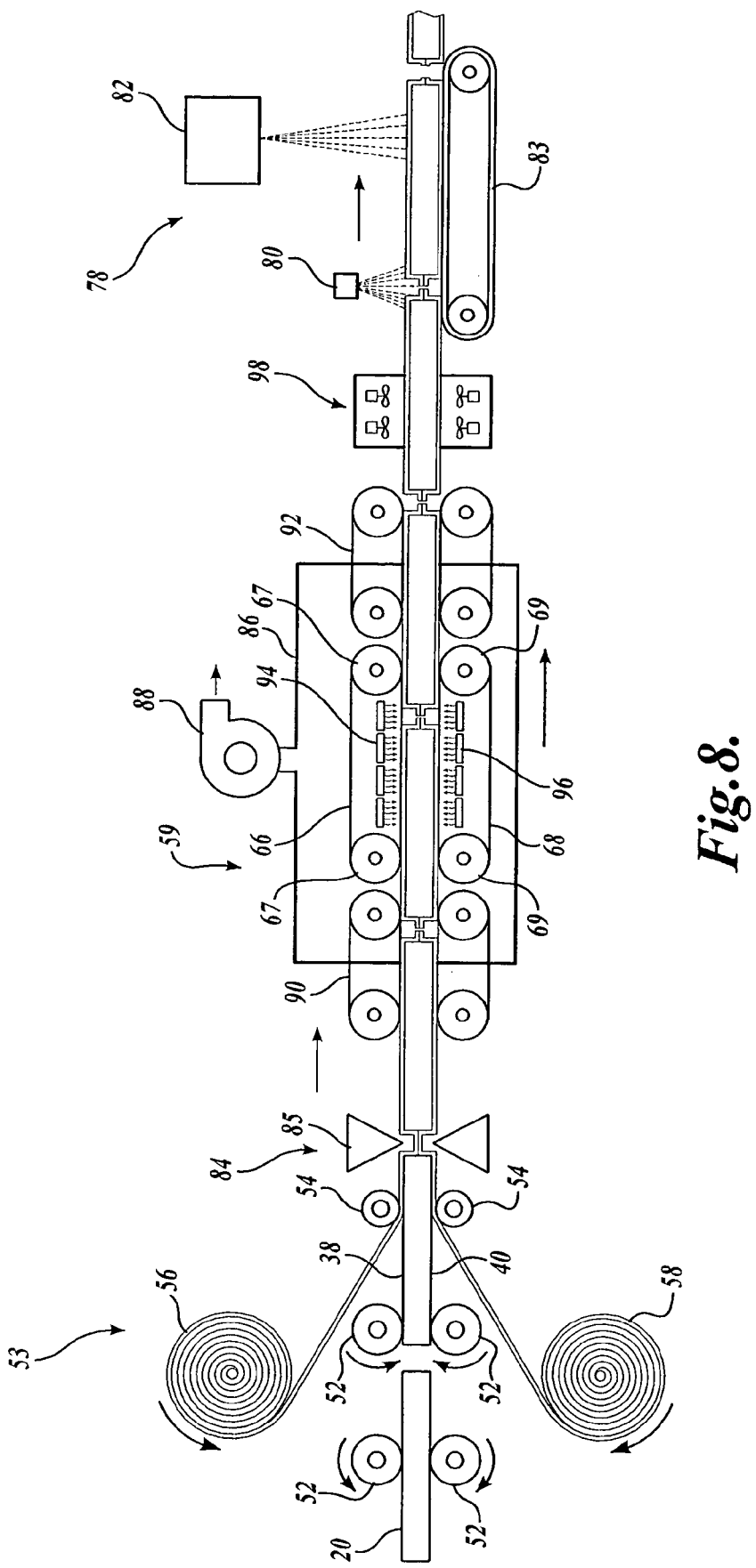
FIG. 8 is a diagrammatic view of a process for encapsulating a cellulose based substrate with polymeric films in accordance with the present invention.

Referring to FIG. 8, a method carried out in accordance with the present invention for producing a cellulose based substrates encapsulated in a polymeric film on a continuous basis, as opposed to a batch basis, is illustrated and described in the context of a containerboard blank. A container blank 20 from a source of container blanks (not shown) is delivered via a conveyance system illustrated as two sets of rollers 52 to a film application stage 53. In film application stage 53, film delivery rollers 54 receive a polymeric film from a first source of film 56 and a second source of film 58. Film 56 is provided adjacent upper first surface 38 of container blank 20 and film 58 is provided adjacent lower second surface 40 of container blank 20. The width of films 56 and 58 measured in a direction transverse to the direction that container blanks 20 travel is greater than the width of the blanks. Thus, portions of films 56 and 58 extend beyond the edges of the blanks that are parallel to the direction that the blank travels. In the direction that blanks travel through the process, individual blanks are spaced apart. Films 56 and 58 bridge the space between the trailing edge of one blank and the leading edge of the next blank. The web comprising container blank 20 and films 56 and 58 are delivered from film application stage 53 to sealing stage 84. Sealing stage 84 includes apparatus for providing a moisture resistant seal between films 56 and 58 in the space between the trailing edge of one blank and the leading edge of the next blank. Suitable means for providing such seal include a bar sealer 85 or equivalent equipment. When bar sealer 85 is used, it seals the films to each other and also severs the film that extends between two consecutive blanks. At the time the web leaves sealing stage 84, overlapping portions of films 56 and 58 adjacent the side edges parallel to the direction of travel of the container blank are not sealed in this embodiment. In other embodiments, the films can become sealed to each other around three edges of the container in the sealing stage. Even a portion of a fourth edge can be sealed, provided that gas within the envelope can escape and the pressure within the envelope can equilibrate with the vacuum in the vacuum chamber as described below in more detail. From sealing stage 84, blank 20, sleeve wrapped with the overlapping films 56 and 58 is delivered to heating stage 59.

In the embodiment of FIG. 8, heating stage 59 includes vacuum chamber 86. Vacuum chamber 86 is an airtight vessel in fluid communication with vacuum pump 88. Vacuum chamber 86 includes an inlet provided with an inlet airlock 90. Inlet airlock 90 permits the combination of container blank 20, first film 56, and second film 58 to enter vacuum chamber 86 without compromising the vacuum created within vacuum chamber 86. Vacuum chamber 86 also includes an outlet provided with an outlet airlock 92 which is configured to allow the combination of container blank 20, first film 56 and second film 58 to exit vacuum chamber 86 without compromising the vacuum created within vacuum chamber 86. Other systems besides airlocks for providing an airtight seal at the inlet and outlet of chamber 86 can be used. Vacuum chamber 86 also includes a conveyance system for supporting movement of the container blanks 20 and films 56 and 58 through vacuum chamber 86. In the illustrated embodiment, the conveyance system comprises an upper conveyer belt 66 and a lower conveyor belt 68 that are spaced apart in the vertical direction. Conveyor belt 66 is driven by a rollers 67 and conveyor belt 68 is driven by rollers 69. Conveyor belts 66 and 68 include non-stick surfaces to prevent adhesion between the conveyor belt and films 56 and 58. Preferably, conveyor belts 66 and 68 comprise an open mesh belt or a plurality of spaced apart parallel belts. Teflon®-coated belts are one example of suitable non-stick surfaces. Within vacuum chamber 86 is an upper source of electromagnetic radiation 94 positioned above container blank 20 and films 56 and 58. Also within vacuum chamber 86 is a lower electromagnetic radiation source 96 positioned below the container blank and films. Upper electromagnetic radiation source 94 and lower electromagnetic radiation source 96 direct electromagnetic radiation at films 56 and 58 and blanks 20. Suitable electromagnetic radiation includes infra-red, microwave, and radio frequency radiation.

In accordance with the present invention, container blank 20 and films 56 and 58 from sealing stage 84 enter vacuum chamber 86 through inlet airlock 90. The pressure in vacuum chamber 86 is less than atmospheric. Once present within vacuum chamber, air within the sleeve wrapped container blank, e.g., within the corrugated portion of the blank as well as air between the blank and films is at least partially evacuated, thus reducing the pressure within the envelope formed by films 56 and 58 and equilibrating it with the vacuum in vacuum chamber 86. As the combination of container blank and films passes through vacuum chamber 86 and between upper electromagnetic radiation source and lower magnetic radiation source 96, electromagnetic radiation is directed at the combination, increasing the temperature of films 56 and 58 including those portions that extend beyond the periphery of the blank, so that they soften, become tacky, and capable of adhering to each other and the surfaces of container blank 20. By using electromagnetic radiation, the temperature of the films can be raised in several different ways. For example, the electromagnetic radiation can directly increase the temperature of the film. In addition, the electromagnetic radiation can increase the temperature of the blank, which in turn can increase the temperature of the adjacent film through conduction. Additionally, the electromagnetic radiation can drive moisture out of the blank in the form of steam which contacts the film and increases its temperature.

As noted above, as the temperature of the film increases, it becomes tacky. This tackiness allows the films to adhere to each other. In addition, the films begin to adhere to the container blank. The adhesion that occurs when the films are tacky is not as strong as the adhesion that occurs once the film has been cooled to substantially below the temperature at which the films become tacky, such as room temperature.

While the films are in this tacky state, they will adhere to each other at substantially all points where they overlap. In this manner, the films form an envelope that substantially encapsulates the container blank. As described below in more detail, the envelope is formed in such a manner that a pressure differential can be provided between the environment inside the envelope and the environment outside the envelope. An envelope formed around the container blank is suitable so long as it encapsulates the blank in a manner that is capable of supporting a pressure differential between the inside of the envelope and the outside. For example, two films sealed to each other adjacent the leading and trailing edges of a container blank, but not the parallel side edges would not substantially encapsulate a blank so as to be suitable for supporting a pressure differential between an environment between the films and an environment outside the films; however, an envelope formed by the films wherein the films form intermittent or reversible bonds around all exposed edges would be satisfactory, because a pressure differential can be created between the interior of the envelope and the environment exterior to the envelope.

Once the films have been heated as described above, and the pressure within the envelope formed by the film around the blank has been reduced and equilibrates with the environment of the vacuum chamber 86, the combination exits vacuum chamber 86 through outlet airlock 92 where it is exposed to an increased pressure environment, e.g., atmospheric pressure.

The pressure differential that exists between the environment within the envelope formed by films 56 and 58 around blank 20 and the environment outside the envelope promotes conformation of films 56 and 58 to the periphery of container blank 20 as well as to any edges defined within slots and cutouts provided in blank 20. More specifically, a container blank and films are treated so that there is a point in the manufacturing process after the films form an envelope around the blank when the pressure within the envelope is lower than the pressure exterior to the envelope. As used herein, the phrase "pressure differential" refers to a difference in pressure between the inside of the envelope and the exterior of the envelope that is attributable to more than the pressure differential that would be observed by simply reducing the temperature of the gas within the envelope without a phase change. For example, in the context of the present invention, a pressure differential can be provided by the condensation of steam within the envelope or moving the envelope from a low-pressure environment to a higher pressure environment with or without cooling of the gas within the envelope.

Conformance of the films to the peripheral edges of the container as well as edges defined within slots and cutouts can be further promoted through the generation of steam and subsequent condensation thereof within the envelope formed by the films 56 and 58 around container 20. As described above, steam can be formed within the envelope by increasing the temperature of the container blank to above a temperature needed to convert moisture in the blank to steam. The steam displaces air out of the envelope through unsealed, overlapping portions of the films. Alternatively, if there are no unsealed portions of the overlapping films, gas can be displaced through those portions of the overlapping films which are adhered less strongly to each other than other areas. When the envelope leaves vacuum chamber 86 and is cooled as described below in more detail, steam within the envelope condenses. Condensation of the steam reduces the pressure within the envelope, thus promoting the pressure differential between the inside of the envelope and the exterior of the envelope as described above. Condensation of the steam should occur after the films are bonded to each other sufficiently that gas cannot pass through the film-to-film seals and into the envelope. The encapsulated blanks exiting the vacuum chamber are received into cooling stage 98.

Cooling stage 98 includes equipment for reducing the temperature of the films. In the illustrated embodiment of FIG. 8, cooling stage includes a plurality of fans for reducing the temperature of the films. It should be understood that other conventional systems for reducing the temperature of the films can also be used. Cooling of the blank and films should be carried out as soon as possible after the container blank and films exit the outlet airlock in order to make the film-to-film seal permanent.

From cooling stage 98, the blanks and adhered films are delivered to trimming stage 78 where excess film is removed from the periphery of the blank and from within cutouts and slots. In the illustrated embodiment, trimming stage 78 includes a sensor and a laser for removing excess film. Other types of technology can be used to trim away the excess film such as die cutters or hand trimming. When laser trimming is used, an added benefit is that the laser further seals the films together at locations where the laser is applied.

In order to ensure the accuracy of the film trimming when a laser is used, trimming stage 78 preferably employs a conveyance system 83 that minimizes movement of the container blank and films during the trimming process.

Figure 9:
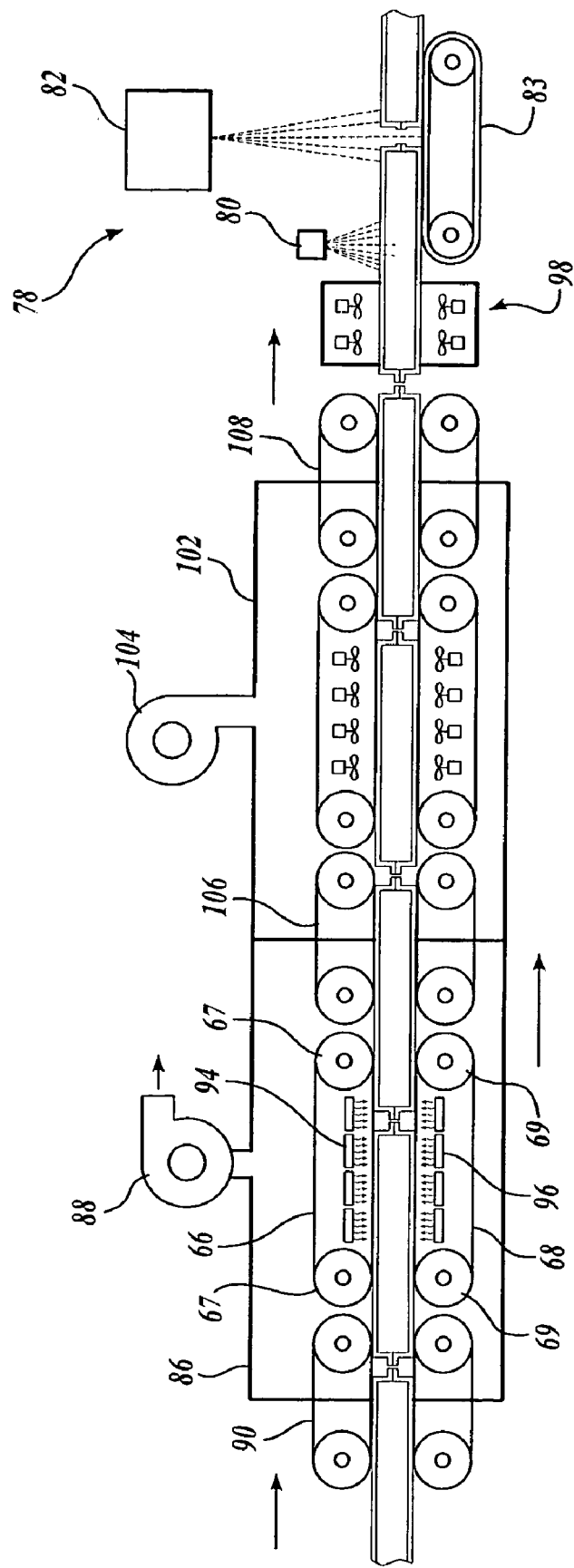
FIG. 9 is a diagrammatic view of a second embodiment of a process for encapsulating a cellulose based substrate with polymeric films in accordance with the present invention.

It should be understood that there are numerous variations to the method described above with reference to FIG. 8. For example, FIG. 9 depicts the vacuum chamber 86 of FIG. 8 but reasons of brevity, omits the process components upstream of vacuum chamber 86 in FIG. 8. In FIG. 9, downstream of vacuum chamber 86, a pressure chamber 102 is provided. Pressure chamber 102 is in fluid communication with a pump 104 for pressurizing pressure chamber 102. Pressure chamber 102 communicates with vacuum chamber 86 through an intermediate airlock 106. Intermediate airlock permits transport of container blanks and films between vacuum chamber 86 and pressure chamber 102 while allowing the pressure differential between the two chambers to be maintained. Pressure chamber 102 includes outlet airlock 108 similar to outlet airlock 92 described above with reference to FIG. 8. The system illustrated in FIG. 9 also includes cooling stage 98 and trimming stage 78 as described above with respect to FIG. 8.

The pressure chamber 102 in FIG. 9 provides added flexibility with respect to increasing the pressure differential that is created between the environment within the envelope formed by films 56 and 58 around blank 20 and the environment external to the envelope. In the embodiment of FIG. 8, the pressure differential was provided by the difference in pressures between the vacuum chamber and atmospheric pressure. In contrast, in FIG. 9, the pressure differential is provided by the difference between the below atmospheric pressure in vacuum chamber 86 and the above atmospheric pressure present in pressure chamber 102. The pressure chamber can be provided with a cooling source to control the temperature of the films.

The level of vacuum in the vacuum chamber should be sufficiently low enough that when the envelope exits the vacuum chamber and is exposed to either atmospheric pressure or the pressure in the pressure chamber, satisfactory conformance of the films to the blank is achieved. Satisfactory conformance is evidenced by the absence of air bubbles between the films and the container blank, as well as robust and continuous seals around the periphery of the blank and adjacent the edges defined within the cutouts and slots. The degree of the conformance of the films to the container blank can be evaluated by assessing the distance between the film-to-film bond line and the exposed edge of the container blank. As the distance between the film-to-film bond line and the container blank edge increases, the degree of conformance of the film to the container blank edge decreases. Shorter distances between the blank edge and the film-to-film bond line are more desirable than larger distances. Exemplary levels of vacuum in the vacuum chamber can range from about 200 mm Hg to about 300 mm Hg. The pressure in the vacuum chamber should not be so low that the film is damaged or the vacuum chambers require systems that damage the cellulose based substrates in order to maintain the vacuum.

The pressure in the pressure chamber can vary over a wide range. The pressure in the pressure chamber should be such that it provides a pressure differential effective to provide satisfactory conformance of the film to the container blank. The pressure within the pressure chamber should not be so great that it causes damage to the container blank or so high that it forces the films into the flutes adjacent the exposed edges.

With respect to the electromagnetic radiation, its intensity should be high enough to provide the desired heating of the film or blank, but not so high that it causes deterioration of the blank or the films.

In another embodiment, container blanks 20 in FIG. 8 can be preheated prior to coming into contact with films 56 and 58. Preheating container blanks 20 to a temperature above the temperature that moisture within the container blanks will be converted to steam and then quickly applying the film 56 and 58 to the preheated container blanks and delivering them to vacuum chamber 86 is another way of providing steam within an envelope formed around the container blank. Preheating the container blanks can be achieved in any manner that effectively raises the temperature of the blank. For example, thermal energy or electromagnetic radiation can be used to preheat the blanks.

In another embodiment, a secondary heating stage (not shown) can be provided between outlet airlock 92 and cooling stage 98. Secondary heating stage between vacuum chamber 86 and cooling stage 98 can be used to generate steam within the envelope. In addition, if the films cool too quickly after exiting the outlet airlock, this secondary heating stage can extend the time which the film remains near or above its melt point for a sufficient period of time to allow the pressure differential to ensure intimate conformation of the films to the blank. This heating stage can include sources of electromagnetic radiation to heat the film and blank or it can include thermal sources such as hot air knives, radiant heaters and the like.

The blank preheat stage and intermediate heating stage described above can also be combined in a single process line so that both a preheating stage and a secondary heating stage are provided.

The electromagnetic radiation sources described above include sources capable of providing infrared radiation as well as microwave or radio frequency radiation. The particular choice of electromagnetic radiation will depend in part upon the ability of the particular type of electromagnetic radiation to increase the temperature of the film. In addition, consideration may be given to the ability of the particular type of electromagnetic radiation to increase the temperature of the blank to a temperature that will result in a conversion of moisture within the blank to steam.

It should be understood that while in the embodiments of FIG. 8 and FIG. 9, airlocks are described as being used, combinations of other types of components such as brushes, soft rollers and wiper blades that allow for the entry and exit of the container blanks and film into a vacuum chamber or pressure chamber without substantially compromising the reduced or increased pressure within the respective chamber can be utilized. For example, one alternative includes a combination of a soft roller and flexible wiper for sealing the upper surface of the combination of a container blank and film 56 to the vacuum/pressure chamber and a brush for sealing the lower surface of the blank and film 58 to the vacuum/pressure chamber.

In a modification to the system and method described above with reference to FIG. 8, a web formed by container blank 20 and films 56 and 58 can be delivered to the vacuum chamber without sealing the leading and trailing edges as described above. In this embodiment, a device is provided within the vacuum chamber to seal the films to themselves around all four peripheral edges of the blank. The sealing of the film around all four edges occurs after the pressure between the two films equilibrates with the vacuum within the vacuum chamber. In this manner, a seal is provided around the entire periphery of the blank which is then delivered to electromagnetic heating sources either within the vacuum chamber or external to the vacuum chamber in order to heat the film. The pressure differential is provided by passing the sealed web into an atmospheric pressure environment or into a pressure chamber. The heated films conform to and form moisture resistant seals around any edges that were not sealed by the device described above, e.g., edges defined by slots and cutouts.

While the embodiment of FIG. 8 has been described with respect to a vacuum chamber, an alternative would be to carry out the exposure of the web comprising the blank and films to electromagnetic radiation at atmospheric pressure and then delivering the treated web to a pressure chamber that would expose the web to a pressure higher than atmospheric pressure. Again, the pressure differential between atmospheric and the pressure within the pressure chamber would promote the conformance of the films to the topography of the container blank. The resulting encapsulated container blank can then be treated in the cooling stage and trimming stage as described above.

Figure 4:
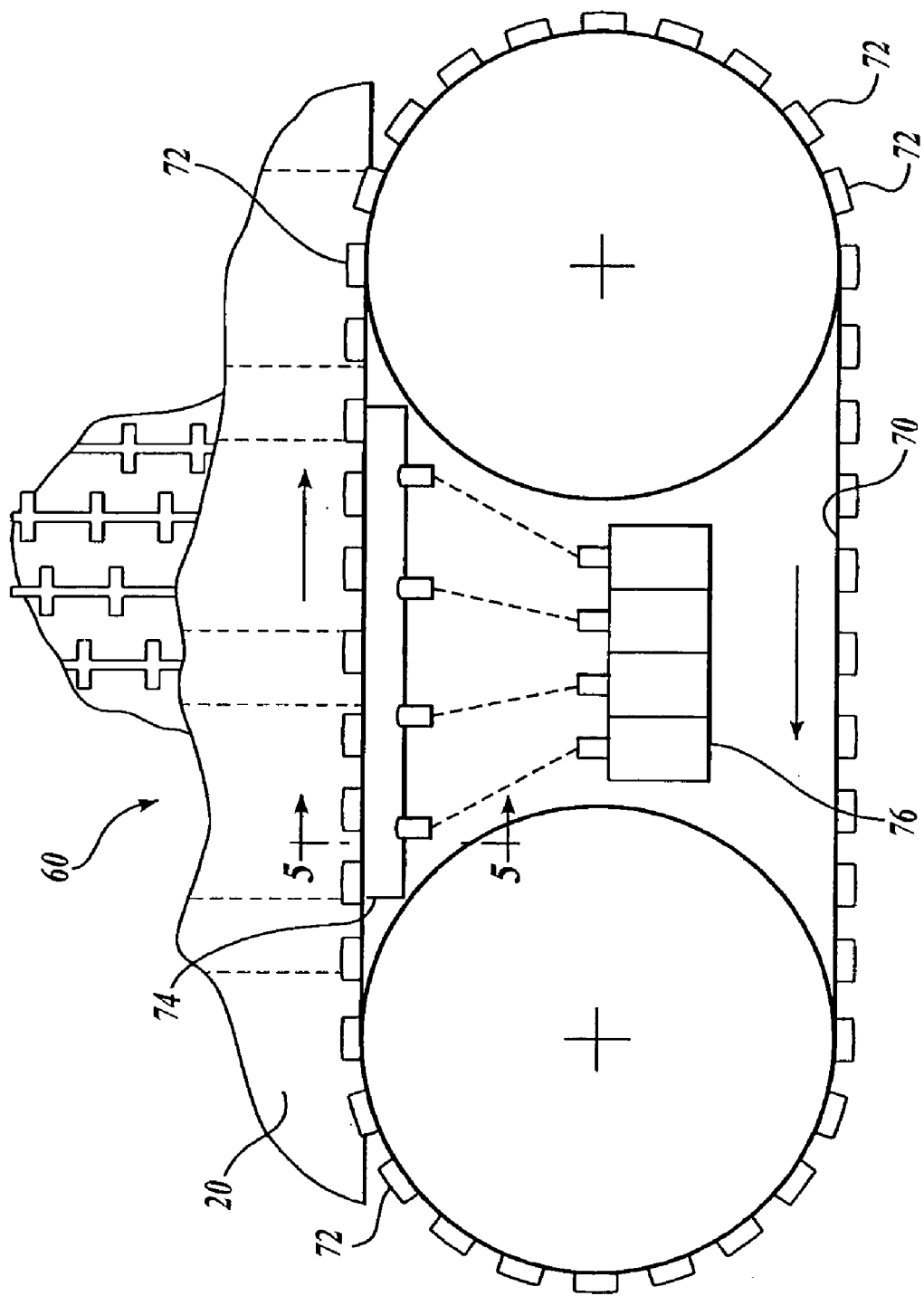
FIG. 4 is a top schematic view of a nozzle arrangement for creating a pressure differential between an environment within an envelope formed by the first polymeric film and the second polymeric film and an environment outside the envelope in accordance with the present invention.
Figure 5:
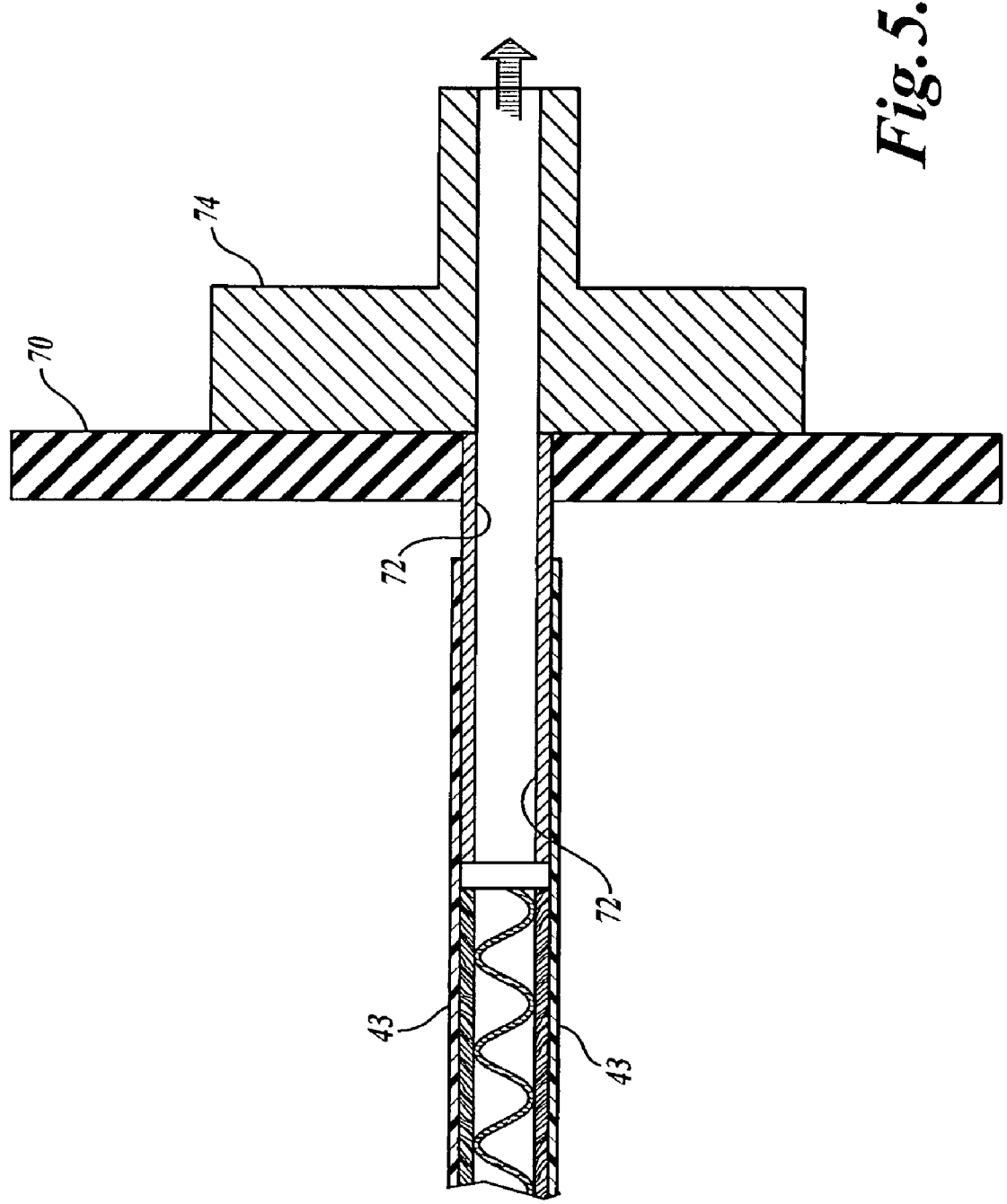
FIG. 5 is a sectional view taken along line 5-5 in FIG. 4.

Referring to FIGS. 4 and 5, another alternative for reducing the pressure within the envelope defined by the two films around the container blank is to provide a rotating belt 70 that carries a plurality of nozzles 72. Belt 70 travels at the same speed that container blanks 20 and films 56 and 58 travel through heating stage 59. A manifold 74 that is in fluid communication with vacuum pumps 76 is present between the rollers that drive the belt 70. Within heating stage 59, one end of nozzle 72 engages manifold 74. The opposite end of nozzle 72 is positioned between the moisture resistant films 56 and 58. Activation of the vacuum pumps draws air out of the envelope through the nozzles thus reducing the pressure within the envelope. The evacuated envelope can then be processed in a manner similar to that described above with respect to FIG. 8.

The present invention has been described above in the context of a containerboard blank encapsulated with a polymeric film. The containerboard blank can be formed and secured to provide a moisture-resistant container. In addition, such a moisture-resistant container can be combined with other structural components such as inner packings, described above, that may be encapsulated with a polymeric film, or may not be encapsulated with a polymeric film. Furthermore, containers can be provided wherein the container body is not encapsulated with a polymeric film while certain inner packing structural components are encapsulated with a polymeric film. In addition, cellulose based inner packings encapsulated with a polymeric film can be combined with non-cellulosic based container bodies and cellulose based container bodies encapsulated with polymeric film can be combined with non-cellulosic inner packing structural components.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for encapsulating a cellulose based substrate with a polymeric film, the method comprising:
   providing a cellulose based substrate, the cellulose based substrate having a first surface, a second surface opposite the first surface, and a cellulose based substrate periphery;
   providing a first polymeric film adjacent the first surface and extending beyond the cellulose based substrate periphery;
   providing a second polymeric film adjacent the second surface and extending beyond the cellulose based substrate periphery, the first polymeric film and second polymeric film defining an envelope that substantially encapsulates the cellulose based substrate;
   increasing the temperature of the first polymeric film and second polymeric film using electromagnetic radiation such that steam is generated within the envelope;
   providing a pressure differential between an environment within the envelope and an environment outside the envelope; and
   bonding the first polymeric film to the second polymeric film adjacent the cellulose based substrate periphery.

2. The method of claim 1, wherein the step of providing a pressure differential comprises condensing the steam generated within the envelope.

3. The method of claim 1, wherein the polymeric film is moisture-resistant.

4. The method of claim 1, wherein the cellulose based substrate includes cut-outs and slots.

5. The method of claim 4, further comprising the step of bonding the first polymeric film to the second polymeric film adjacent the cut-outs or slots.

6. The method of claim 1, wherein the cellulose based substrate comprises inner packings for a container selected from U-boards, H-boards and corner boards.

7. The method of claim 1, wherein the first polymeric film and second polymeric film comprise identical structures and composition.

8. The method of claim 1, wherein the first polymeric film and second polymeric film are different in structure.

9. The method of claim 1, wherein the first polymeric film and the second polymeric film are different in composition.

10. The method of claim 1, further comprising the step of trimming the first polymeric film and/or the second polymeric film after the bonding step.

11. The method of claim 10, wherein the step of trimming is carried out using a laser.

12. The method of claim 1, further comprising the step of heating at least the first or second polymeric film before the step of providing the respective film adjacent the respective first or second surface of the cellulose based substrate.

13. The method of claim 1, wherein the step of providing a pressure differential comprises subjecting the envelope to a first pressure environment followed by a second pressure environment, pressure in the first pressure environment being less than pressure in the second pressure environment.

14. The method of claim 1, wherein the electromagnetic radiation is selected from the group consisting of infrared radiation, microwave radiation, and radio frequency radiation.

15. The method of claim 1, wherein the step of providing a pressure differential comprises subjecting the envelope to a first pressure environment, pressure in the first pressure environment being greater than atmospheric pressure.

16. The method of claim 1, further comprising reducing the resilience of a portion of the cellulose based substrate adjacent the cellulose based substrate periphery.

* * * * *